United States Patent
Kim

(10) Patent No.: US 11,805,023 B2
(45) Date of Patent: Oct. 31, 2023

(54) CLOUD-BASED IOT NETWORK VIRTUALIZATION SYSTEM AND NETWORKING METHOD

(71) Applicant: JEJU NATIONAL UNIVERSITY INDUSTRY-ACADEMIC COOPERATION FOUNDATION, Jeju-si (KR)

(72) Inventor: Do Hyen Kim, Jeju-si (KR)

(73) Assignee: JEJU NATIONAL UNIVERSITY INDUSTRY-ACADEMIC COOPERATION FOUNDATION, Jeju-si (KR)

( * ) Notice: Subject to any disclaimer, the term of this patent is extended or adjusted under 35 U.S.C. 154(b) by 452 days.

(21) Appl. No.: 17/270,459

(22) PCT Filed: Apr. 1, 2019

(86) PCT No.: PCT/KR2019/003774
§ 371 (c)(1),
(2) Date: Feb. 23, 2021

(87) PCT Pub. No.: WO2020/040396
PCT Pub. Date: Feb. 27, 2020

(65) Prior Publication Data
US 2021/0328880 A1    Oct. 21, 2021

(30) Foreign Application Priority Data
Aug. 23, 2018  (KR) .......................... 10-2018-0098636

(51) Int. Cl.
*H04L 12/24*  (2006.01)
*H04L 41/14*  (2022.01)
(Continued)

(52) U.S. Cl.
CPC ............ *H04L 41/145* (2013.01); *G16Y 30/00* (2020.01); *G16Y 40/10* (2020.01); *G16Y 40/35* (2020.01); *H04L 67/12* (2013.01)

(58) Field of Classification Search
None
See application file for complete search history.

(56) References Cited

U.S. PATENT DOCUMENTS

2016/0357523 A1* 12/2016 Zhang ........................ G06F 8/34
2016/0357525 A1* 12/2016 Wee ........................... G06F 8/33
(Continued)

FOREIGN PATENT DOCUMENTS

| KR | 10-1748548 B1 | 6/2017 |
| KR | 10-2018-0055198 A | 5/2018 |
| KR | 10-2018-0066356 A | 6/2018 |

OTHER PUBLICATIONS

International Search Report for PCT/KR2019/003774 dated Jul. 2, 2019 from Korean Intellectual Property Office.
(Continued)

*Primary Examiner* — Eunsook Choi
(74) *Attorney, Agent, or Firm* — Revolution IP, PLLC

(57) ABSTRACT

A cloud-based IoT device virtualization network system includes: a cloud-based virtual server which, in response to registration requests received from multiple IoT devices, creates virtual sensing objects and virtual actuating objects for the IoT devices including various sensors and actuators, and creates a virtual object list and a mapping table presenting information about the connections between the IoT devices and the virtual objects and stores the created table and list therein; a client terminal including a client application stored therein which receives the virtual object list from the virtual server, sets connection relations between the virtual objects on the basis of the virtual object list, and transmits the settings to the virtual server; and a controller (Continued)

formed in the cloud to operate connectivity between the virtual sensing objects and the virtual actuating objects according to the connection settings of the client application.

13 Claims, 10 Drawing Sheets

(51) Int. Cl.
*G16Y 40/10* (2020.01)
*G16Y 30/00* (2020.01)
*G16Y 40/35* (2020.01)
*H04L 67/12* (2022.01)
*H04L 29/08* (2006.01)

(56) References Cited

U.S. PATENT DOCUMENTS

2016/0359664 A1* 12/2016 Malegaonkar .......... H04L 67/12
2018/0359259 A1* 12/2018 Leon ....................... G06F 9/445
2019/0230029 A1*  7/2019 Eswara .................. H04L 45/48
2020/0004655 A1*  1/2020 Abrami .................. G06N 20/00

OTHER PUBLICATIONS

Youngjun Kim et al., "Device Objectification and Orchestration Mechanism for IoT Intelligent Service", The Journal of Korean Institute of Communications and Information Sciences, vol. 38, No. 1, Jan. 2013, pp. 19-32.
Muhammad Golam Kibria et al., "A User-Centric Knowledge Creation Model in a Web of Object-Enabled Internet of Things Environment", Sensors 2015, vol. 15, No. 9, Sep. 18, 2015, pp. 24054-24086.

* cited by examiner

<SCHEMATIC DIAGRAM OF IOT NETWORK VIRTUALIZATION>

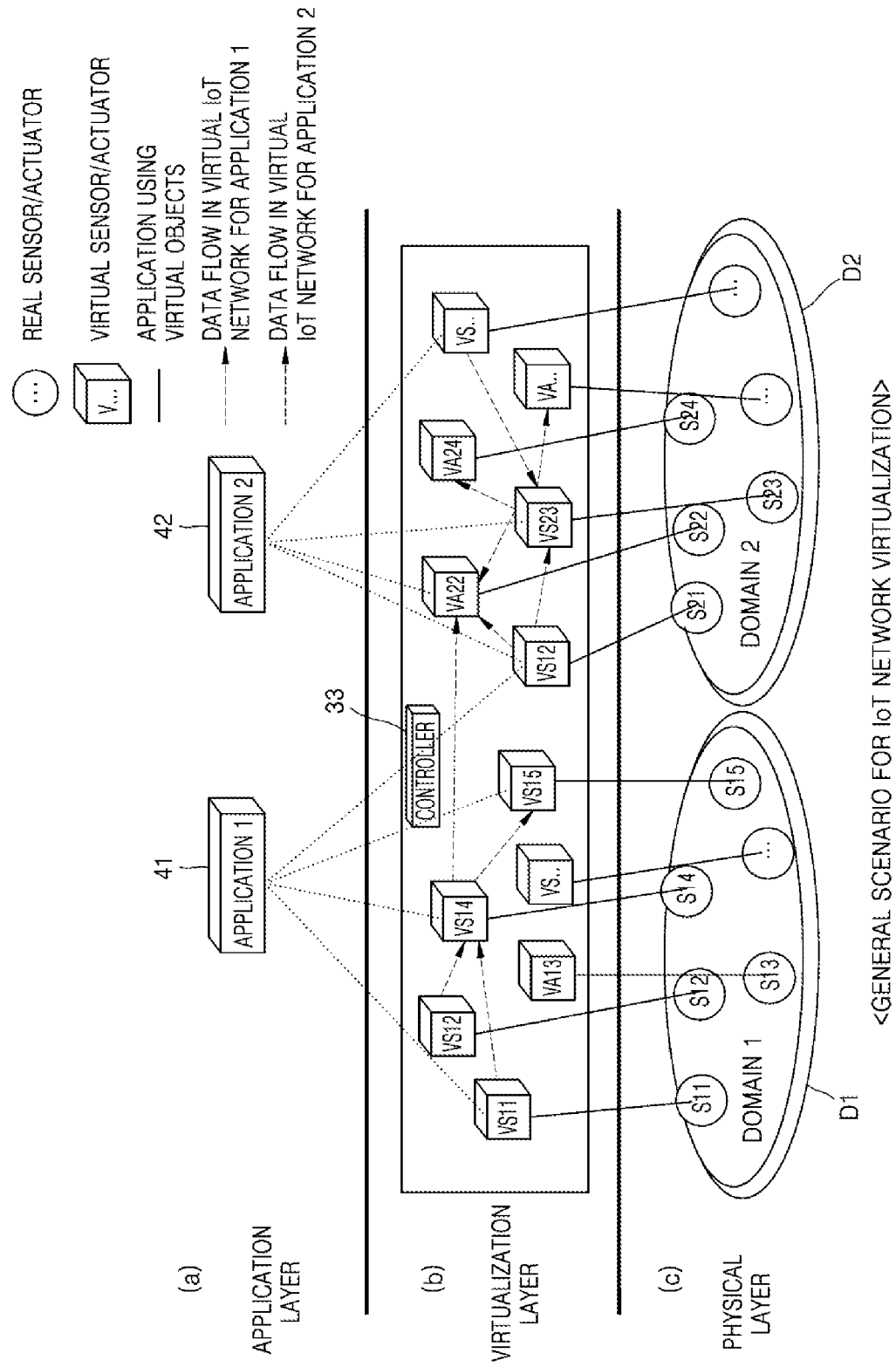

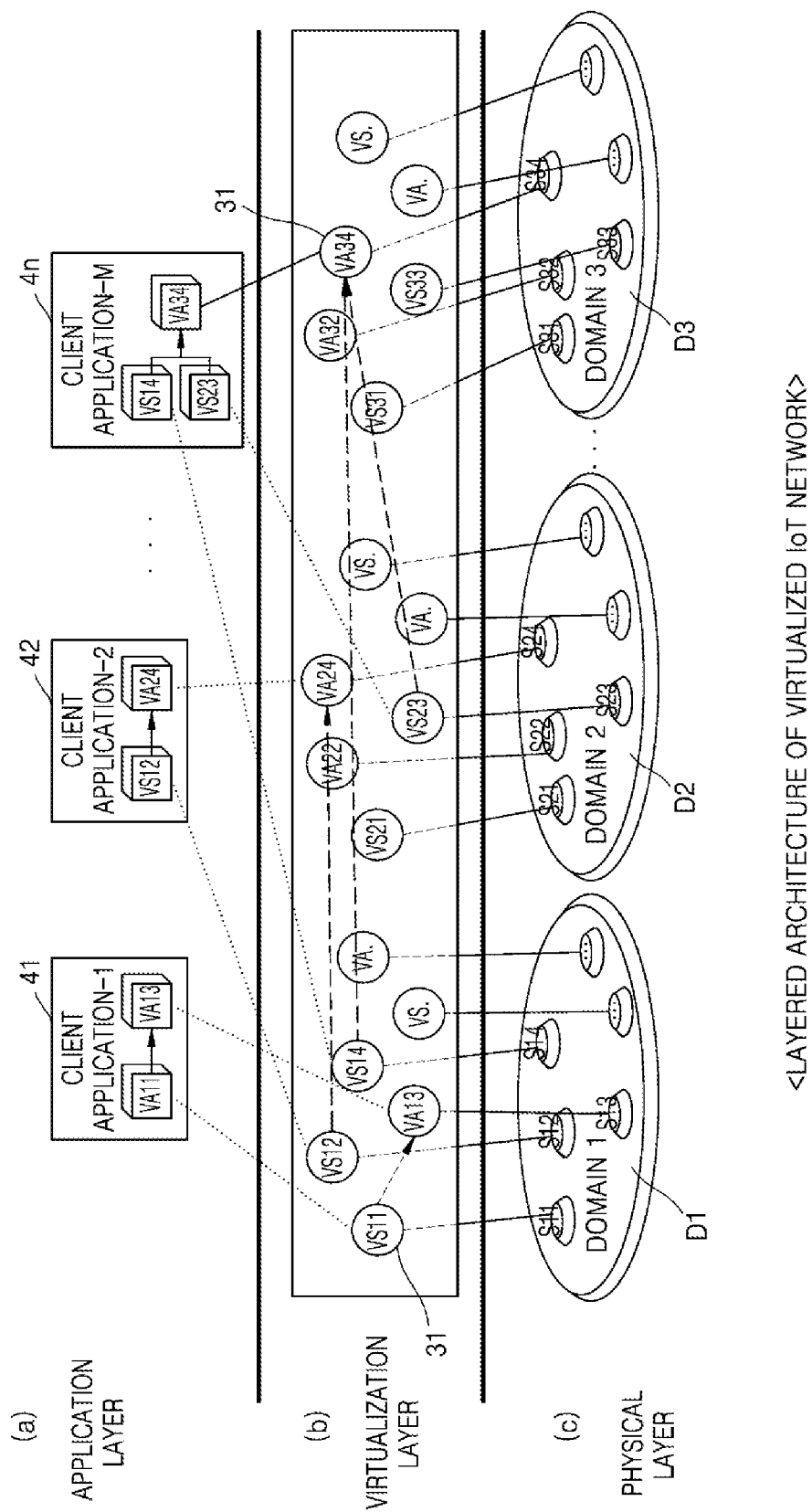

<SCENARIO 2 FOR VIRTUALIZED IOT NETWORK WITH ONE-TO-ONE AND MANY-TO-ONE DEVICE CONNECTIVITY>

<SCENARIO 3 FOR VIRTUALIZED IoT NETWORK WITH MANY-TO-ONE AND ONE-TO-MANY DEVICE CONNECTIVITY>

CLOUD-BASED IOT NETWORK VIRTUALIZATION SYSTEM AND NETWORKING METHOD

CROSS REFERENCE TO PRIOR APPLICATIONS

This application is the 35 U.S.C. 371 national stage of International application PCT/KR2019/003774 filed on Apr. 1, 2019; which claims priority to Korean Patent Application No. 10-2018-0098636 filed on Aug. 23, 2018. The entire contents of each of the above-identified applications are hereby incorporated by reference.

TECHNICAL FIELD

The present invention relates to a cloud-based Internet of things (IoT) device network system, and more particularly, to an IoT device virtualization system and networking method, which build a dynamic IoT network by connecting multiple IoT devices in a physical space to a cloud and provide dynamic connectivity between the IoT devices in the physical space over the dynamic IoT network.

BACKGROUND ART

An Internet of things (IoT) device, which is a sensing device or actuating device attached to a daily life object installed in a home or office, may transmit sensing data and receive a command from an actuator. The IoT device includes a signal source such as a sensor, an actuator, or a light emitting diode (LED).

Conventionally, a program or application (app) required for controlling an IoT device is installed on a mobile device such as a personal computer (PC) or a smartphone to control the IoT device.

IoT devices are connected to a network through routers. IoT devices installed in a facility may be controlled by installing an application for controlling the IoT devices on a user's mobile device. For example, to control a first IoT device, the user installs a client program provided by a service provider of the first IoT device on the user's mobile device and accesses the first IoT device through the network to control the first IoT device. The client program may be downloaded from an application store (app store) and installed on the user's mobile device.

In order to control the IoT devices, a server program is installed in each of the IoT devices. Therefore, when the user requests a control command to an IoT device through the mobile device, the server program installed in the IoT device executes a specific command in response to the request or transmits a response to the mobile device.

Various IoT-based applications have been developed to build smart environments for homes, cities, health, education, security, entertainment, and industries.

A connection setup between a sensing device and an actuating device and a configuration for network establishment are implemented in either physical IoT devices or an application layer. It is very difficult to change network settings in IoT devices, and each device should be accessed physically or remotely to make desired modification. With a growing number of connected IoT devices, it has become impossible to make changes in individual IoT devices.

Cloud computing technology provides remarkable computational and storage capacities to overcome the limited resources of IoT devices. The cloud function generates data for a variety of applications and supports execution of complicated computations specifically designed to process large data.

Previously, most of the virtualization studies focused on sensor virtualization in a cloud environment. All of data collection from virtualized sensors and processing operations on connected virtual objects were handled in applications logics, and there was no indirect support for establishment of a virtual dynamic IoT network to interconnect numerous IoT devices and formation of a dynamic physical IoT device based on the virtual IoT network.

However, with the advent of IoT, two types of devices (i.e., sensors and actuators) may be connected.

Therefore, there is a need for studying network virtualization of IoT devices in a cloud environment to facilitate remote access and control of the IoT devices, like network function virtualization (NFV) which defines virtualized network functions.

DISCLOSURE

Technical Problem

Therefore, the present invention has been made in view of the above problems, and it is an object of the present invention to provide a cloud-based Internet of things (IoT) network virtualization system and networking method, which virtualize all of numerous IoT sensors and actuators into virtual objects and build a virtual IoT network over which signals are transmitted and received between the virtual objects, to thereby support establishment of an IoT network that interconnects IoT devices in a physical space.

Technical Solution

According to an aspect of the present invention, a cloud-based IoT device virtualization network system includes a cloud-based virtualization server configured to create sensing virtual objects and actuating virtual objects for a plurality of IoT devices including sensors and actuators in response to registration requests from the plurality of IoT devices, generate a virtual object list and a mapping table including information about mapping between the IoT devices and the virtual objects, and store the virtual object list and the mapping table, a client terminal configured to store a client application for receiving the virtual object list from the virtualization server, configuring a connection setting between virtual objects based on the virtual object list, and transmitting information about the connection setting to the virtualization server, and a controller formed on a cloud and configured to manipulate connectivity between a sensing virtual object and an actuating virtual object according to the connection setting of the client application. A sensing signal is transmitted and received between the sensing virtual object and the actuating virtual object for which the connection setting is configured, and the virtualization server receives sensing data from an IoT device and transmits, to the IoT device, an activation command to an IoT device to be activated as a result of the signal transmission and reception between the connected objects.

Therefore, the present invention may build a virtual dynamic IoT network by connecting a sensing virtual object to an actuating virtual object and thus provide dynamic connectivity among IoT devices in a physical space.

A sensing IoT device may transmit sensing data in response to an activation command from the virtualization server, the sensing virtual object may transmit a sensing signal to an already connected actuating virtual object, the actuating virtual object may be activated by receiving the sensing signal, and the controller may transmit an activation signal to an actuator corresponding to the activated activating virtual object.

Further, the client application may provide an interface function for connection settings among a plurality of virtual objects and a user setting about an operation criterion for each virtual object.

One of the sensing virtual object and the actuating virtual object may be available for configuration and operation as a router.

The controller may exist in the virtualization server or a separate server.

The controller may receive the sensing data from the IoT device on the cloud, stores the sensing data in correspondence with the virtual object corresponding to the IoT device, and forward the sensing data according to a preconfigured path and a preconfigured condition for each virtual object.

The controller may configure any one of a plurality of sensing virtual objects and a plurality of actuating virtual objects as a path for network formation and have a mapping table including full path information with a network identifier (ID), a virtual object ID, a source ID, and a destination ID, each virtual object may have a flow table including information about a delivery condition, a source ID, a destination ID, and a next receiving virtual object, and the controller may transmit data to a next transmitting virtual object according to the condition.

According to another aspect of the present invention, a cloud-based virtualized IoT device networking method includes connecting IoT devices of multiple things in a physical space to a cloud, and requesting registration to a virtualization server formed in a cloud-based manner by a plurality of sensing or actuating IoT devices, generating sensing virtual objects and actuating virtual objects for the requesting IoT devices by the virtualization server, forming and storing a virtual object list and a mapping table including information about mapping between the IoT devices and the virtual objects, and transmitting the virtual object list to a client terminal by the virtualization server, configuring a connection setting between the virtual objects based on the virtual object list and transmitting user connection setting information by the client terminal, dynamically connecting a sensing virtual object to an actuating virtual object according to the user connection setting information by a controller of the virtualization server, transmitting and receiving a signal between the sensing and actuating virtual objects for which the connection setting is configured, and transmitting, to an IoT device, a command requesting activation of an IoT device to be activated for signal transmission and reception between the sensing virtual object and the actuating virtual object by the virtualization server.

The cloud-based virtualized IoT device networking method may further include receiving sensing data from the IoT device on the cloud, storing the sensing data in correspondence with the virtual object corresponding to the IoT device, and forwarding the sensing data according to a preconfigured path and a preconfigured condition for each virtual object by the virtualization server.

Further, the cloud-based virtualized IoT device networking method may further include activating a sensing device to be activated according to the user setting by the virtualization server, and when the actuating virtual object is activated by receiving sensing data, transmitting an activation signal to an IoT device corresponding to the actuating virtual object by the virtualization server.

The controller may have a mapping table including full path information with a network ID, a virtual object ID, a source ID, and a destination ID, and each virtual object may have a flow table including information about a delivery condition, a source ID, a destination ID, and a next receiving virtual object. The cloud-based virtualized IoT device networking method may further include transmitting data to a next transmitting virtual object according to a preconfigured path condition by the controller.

The cloud-based virtualized IoT device networking method may further include configuring any one of sensing or actuating virtual objects as a router for network formation.

The client terminal may display an interface screen for a connection setting among a plurality of virtual objects and a user setting about an operation criterion of each virtual object.

Advantageous Effects

According to the above-described cloud-based Internet of things (IoT) network virtualization system and networking method, a virtual network over which signals are transmitted and received between virtual objects is built by virtualizing all of sensors and actuators included in an IoT network into virtual objects. Therefore, network deployment cost may be reduced, compared to a physical network. Further, a manager may dynamically configure and build a network, thereby facilitating modifications to the configuration of an IoT network.

DESCRIPTION OF DRAWINGS

The above and other objects, features and other advantages of the present invention will be more clearly understood from the following detailed description taken in conjunction with the accompanying drawings, in which:

FIGS. 5A and 5B are conceptual diagrams illustrating a virtualized IoT layered architecture according to the present invention;

BEST MODE

Figure 1:
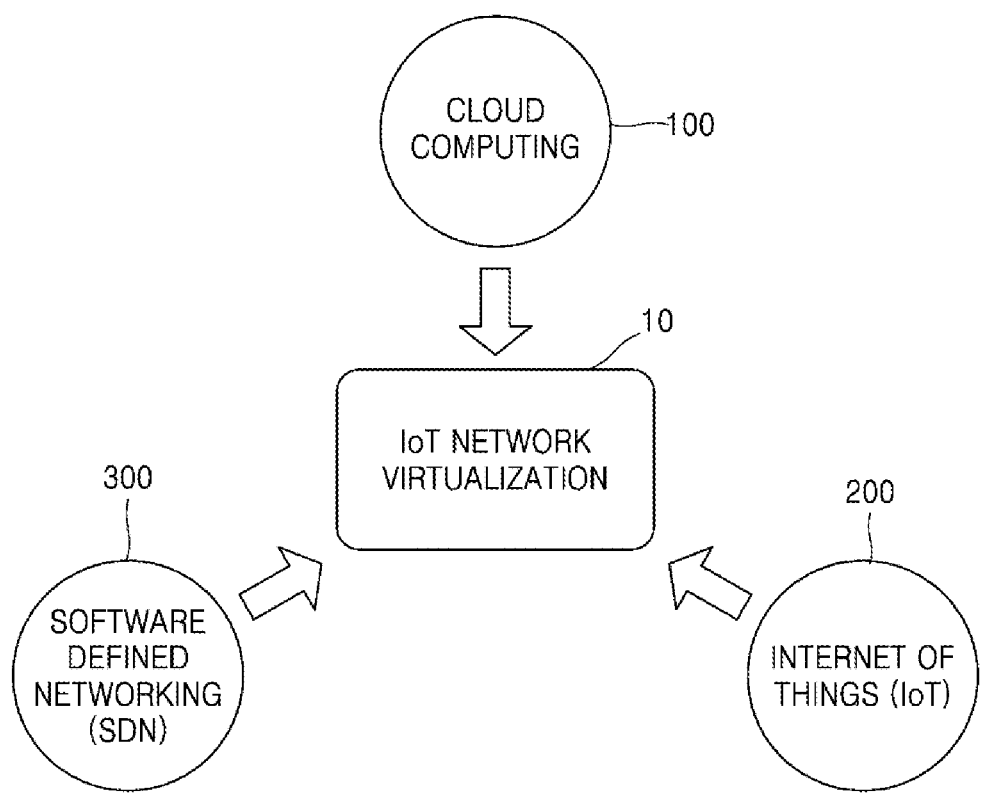
FIG. 1 is a schematic diagram illustrating three relevant fields for a cloud-based virtualized Internet of things (IoT) network according to the present invention.

The advantages and features of the present invention and a method of achieving them will be described in detail in the following embodiments described below in conjunction with the attached drawings. However, the present invention may be implemented in other ways, not limited to the described embodiments. The embodiments are provided simply to describe the present invention in such a detailed manner that those skilled in the art will easily implement the technical idea of the present invention.

In the drawings, the embodiments of the present invention are not limited to the illustrated specific forms. Rather, they are exaggerated for clarity. In addition, like reference numerals denote the same components through the specification. In the specification, the term "and/or" is used to mean inclusion of at least one of enumerated components. Singular forms include plural references, unless otherwise specified. The term "include" or "including" means existence or addition of one or more other components, steps, operations, elements, and devices in a mentioned component, step, operation, and element.

Reference will now be made in detail to the preferred embodiments of the present invention, examples of which are illustrated in the accompanying drawings. Lest it should obscure the subject matter of the present invention, a detailed description of a known function or structure will be avoided in the description of the present invention.

The present invention proposes the concept of establishing a dynamic virtual network among connected Internet of things (IoT) devices in a cloud environment. According to the present invention, multiple IoT devices are registered to a virtualization server on a cloud, and the virtualization server creates virtual objects corresponding to the IoT devices. A virtual IoT network system is then formed by connecting virtual objects on the cloud through a client application according to a user's desired network configuration.

In the present invention, the virtualization server that provides a virtualization representation of the registered IoT devices in the form of virtual objects, for IoT virtualization is prepared on the cloud. The virtualization server stores the virtual objects of all connected IoT devices.

Further, the present invention provides a client interface to an IoT owner (client). The client interface is for registering an IoT device to the virtualization server so that a virtual object corresponding to the IoT device is generated. The client interface is also for accessing the virtual object of the registered IoT device and defining connectivity between IoT devices according to a client's desired network configuration.

Client applications communicate with a centralized controller to specify their required network configuration. Just like a controller in a software defined networking (SDN) network, the controller of the present invention is a centralized module responsible for network formation and maintenance.

MODE FOR INVENTION

FIG. 1 is a schematic diagram illustrating three relevant fields for a cloud-based virtualized IoT network according to the present invention.

As illustrated in FIG. 1, a cloud-based virtualized IoT network system 10 according to the present invention has been developed based on the concept of cloud computing 100, IoT 200, and SDN 300.

In the present invention, the concept of IoT device virtualization has been introduced to facilitate manipulation of IoT devices in the physical world by accessing the IoT devices through the cyber world.

According to the present invention, IoT devices of the IoT 200 are viewed as virtual objects in the cyber world that provides flexible connectivity between sensors and actuators. The present invention provides a virtualized IoT device interface for interacting with and manipulating physical IoT devices in the form of a client application.

Before describing the present invention, a part related to the present invention will be briefly described with respect to SDN and a routing mapping table, which are the basis of the present invention.

Connectivity among virtualized IoT devices is maintained in the network via routing mapping tables. Routing mapping tables provide an efficient and fast way for packet forwarding. Making on-demand changes in routing mapping tables is not easy, and hence the concept of SDN is introduced to separate network control and data planes.

In SDN, a data plane on which packets are delivered and a control plane on which a flow of packets is controlled are separated and centrally processed. The control plane functions to determine how to handle packets, and the data plane functions to transmit packets according to a rule set by the control plane. The rule set by the control plane is stored in a flow table of a switch (the data plane). The flow table includes a set of flow entries.

When a packet is generated in SDN, a network equipment asks SDN control software (SDN controller) where to forward the packet, and reflects the result to determine the path and method of transmitting the packet.

An OpenFlow protocol is commonly used by the SDN controller to update the flow entries in a networking device for on-demand traffic management.

OpenFlow is an open source protocol for interaction between a function (the control plane) for controlling how to deliver a data packet and data delivery (the data plane) by separating the function from the physical network.

OpenFlow is a technology used as an interface standard between an SDN controller and a networking device. OpenFlow is for user-oriented network virtualization, in which a user is authorized to control regardless of basic network equipments such as routers or switches, and a separate software controller controls traffic.

OpenFlow includes an OpenFlow controller and an OpenFlow switch, interconnected by the OpenFlow protocol, and controls flow information to determine a packet delivery path and method.

Throughout the specification, the terms, OpenFlow and SDN may be used as the same meaning or interchangeably.

More specifically, a flow may refer to a series of packets sharing the value of at least one header field or a packet flow of a specific path according to a combination of flow entries of multiple switches, from the viewpoint of one switch.

In the present specification, a flow may mean a specific packet, and may mean a specific packet and other metadata such as an incoming port.

The OpenFlow controller (SDN controller) is a kind of orchestrating computer that controls an SDN system, and may execute various and complex functions, such as routing, policy declaration, and security check. The OpenFlow controller may define a flow of packets generated from a plurality of switches in a lower layer. The OpenFlow controller may calculate a path (data path) through which the flow is to pass by referring to a network topology or the like for the flow allowed by a network policy, and then set the entry of the flow in a switch on the path.

An SDN physical device performs a packet transmission as indicated by the SDN controller (OpenFlow controller). The SDN physical device generically refers to a device that implements the packet transmission function in hardware. The SDN physical device performs a packet transmission based on an action of processing packets in each flow of a variable unit given by a control layer. The SDN physical device performs high-speed flow table matching, and device resource virtualization for network virtualization.

NFV enables the rapid development of the functionalities of real devices in the form of a software package and its convenient deployment in the cloud environment. Moreover, through NFV, these virtual devices may easily be updated, upgraded, replicated, and shared.

A client application 41 in an application layer (a) communicates with a virtualization server 30 and a controller 33 formed on the Internet.

The virtualization server 30 on the Internet includes middleware. The middleware is software that acts as a medium between both sides to allow data exchange by connecting the two sides. The middleware connects a number of processes in multiple computers connected through a network so that the processes may use a service. The middleware exists in a three-layered client/server architecture. The middleware exists in the middle so that a Web browser may store data in or read data from a database.

Figure 3:
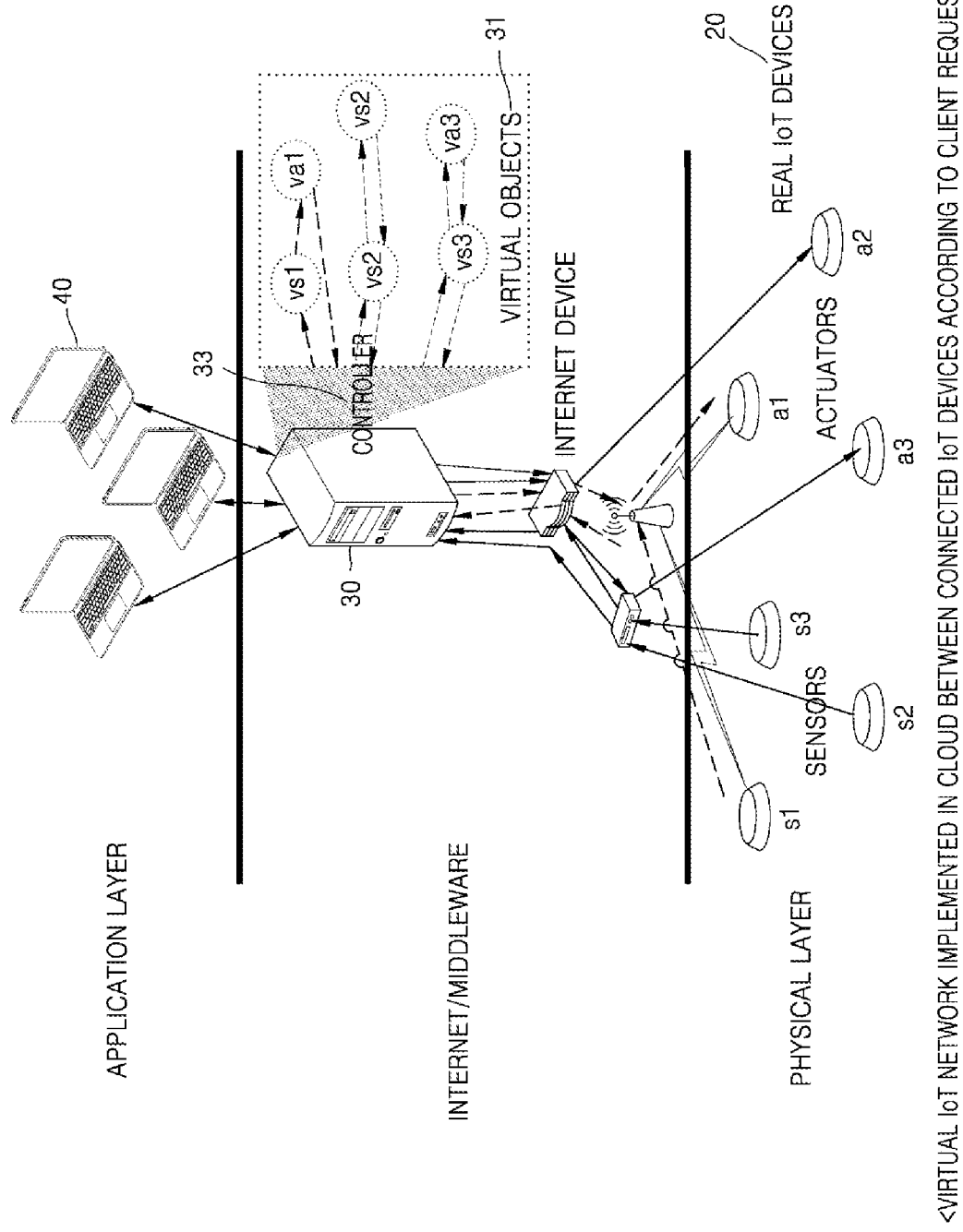
FIG. 3 is a conceptual diagram illustrating a virtualized IoT network according to the present invention.

According to the present invention, as illustrated in FIG. 3, a plurality of sensors s1 to s3 and a plurality of actuators a1 to a3 are virtualized into virtual objects on the cloud, and the virtualization server 30 and the controller 33 which communicate with a plurality of virtual objects 31 are formed on the cloud. Since techniques of forming virtual objects on a cloud are well-known, their detailed description will be avoided herein.

Figure 2:
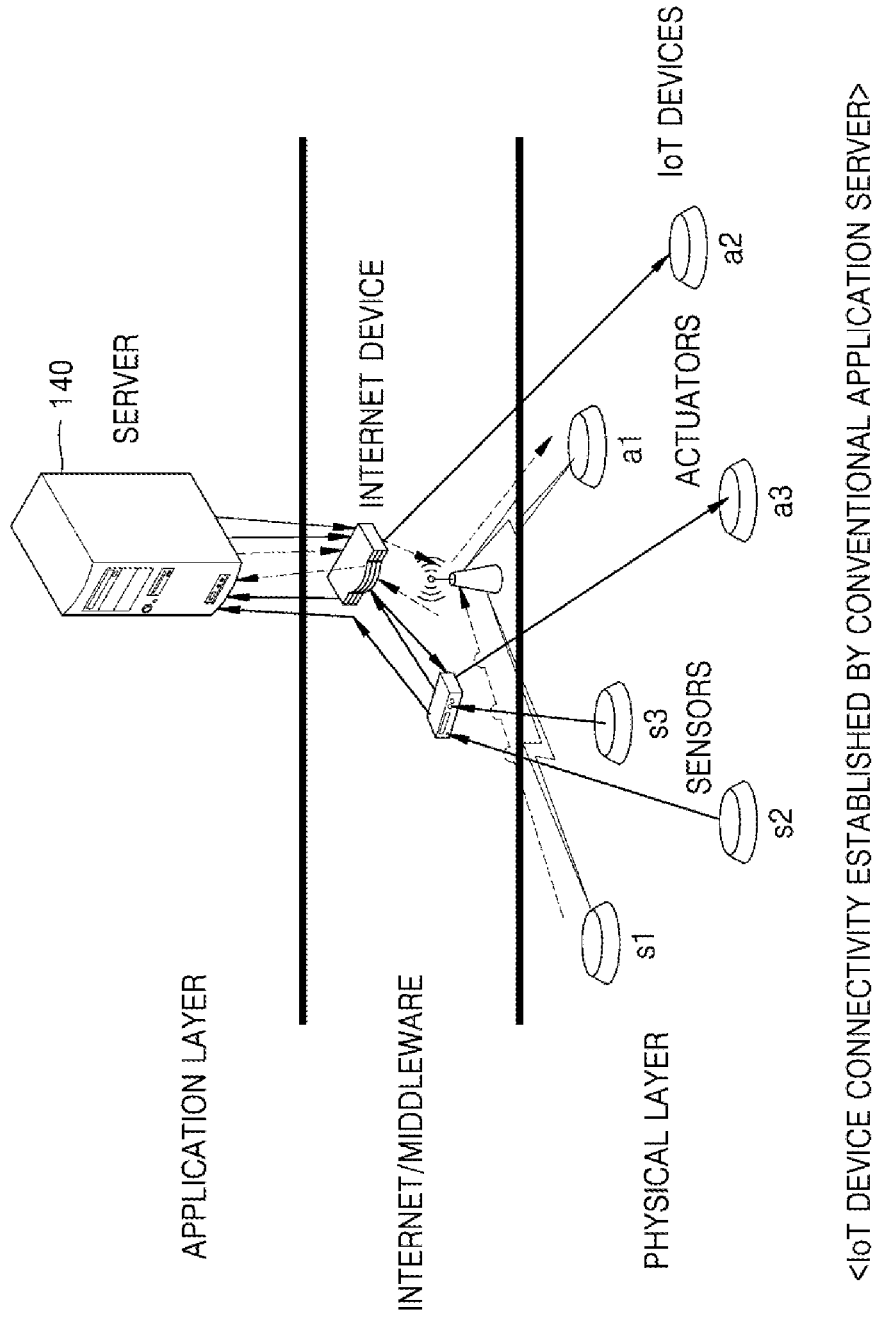
FIG. 2 is a diagram illustrating the configuration of a conventional IoT network.

Referring to FIG. 2, in a conventional IoT network, a server program is formed in the application layer of IoT devices to control the IoT devices. However, according to the present invention, a control signal for operating IoT devices is generated from the client application 41.

Figure 4:
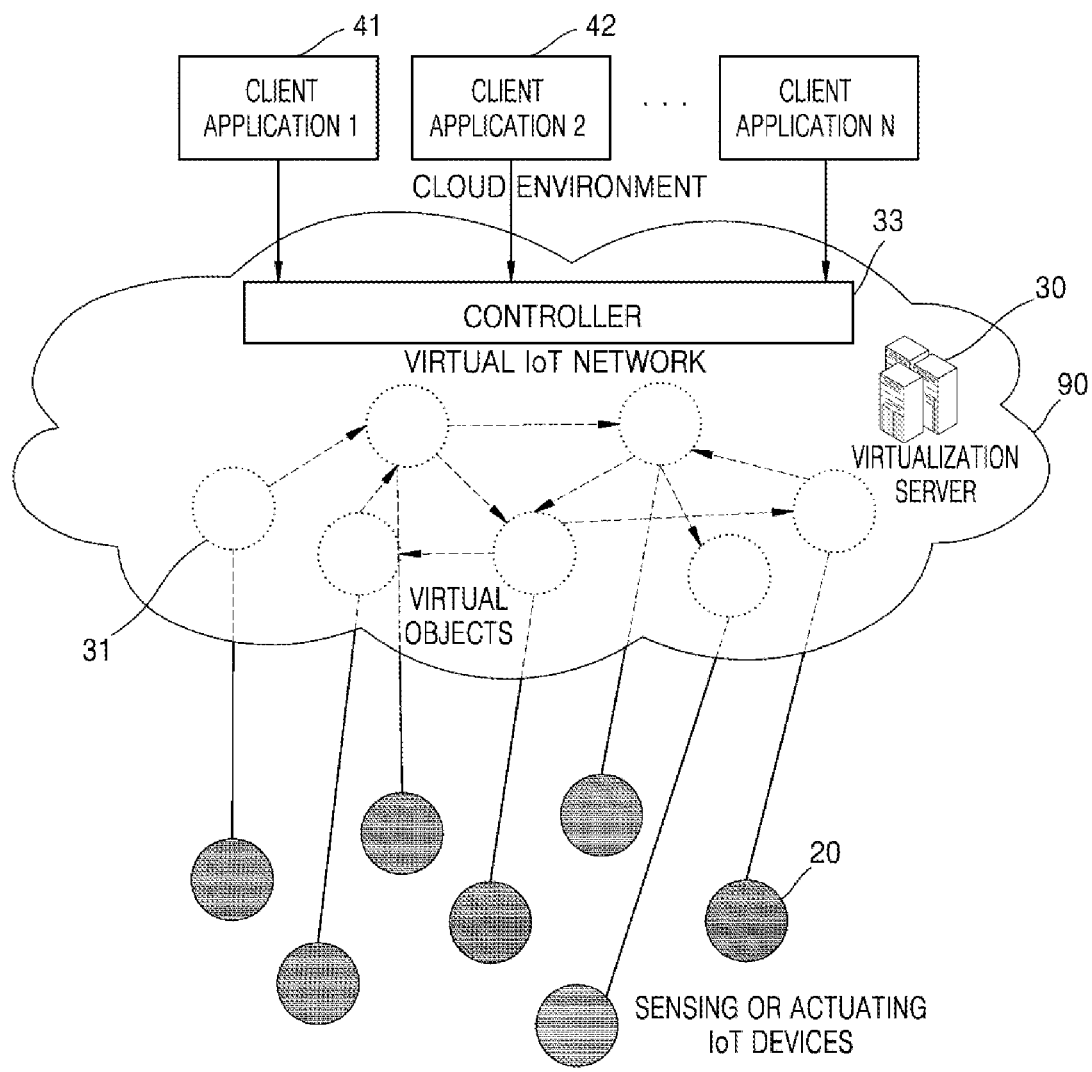
FIG. 4 is a diagram illustrating a signal flow in the virtualized IoT network according to the present invention.

FIG. 4 is a conceptual diagram illustrating a cloud-based virtualized IoT network according to the present invention. All of sensing IoT devices and actuating IoT device are virtualized into virtual objects on a cloud 90. A virtual object list is displayed by an interface of the client application 41, and a client (network administrator) sets a desired network configuration. Accordingly, a plurality of virtual objects may be dynamically connected according to the client's desired network configuration (the connection relationship is indicated by arrows).

More specifically, as illustrated in FIG. 4, the virtualized IoT network includes the virtual objects 31 into which the real sensors s1 to s3 and the real actuators a1 to a3 have been virtualized, the controller (OpenFlow controller) 33 that controls the connections among the virtual objects 31, and the virtualization server 30 that virtualizes the real sensors s1 to s3 and the real actuators a1 to a3 into the virtual objects 31, vs1 to vs3 and va1 to va3.

The virtualization server 30 generates the virtual objects 31, makes a virtual object list listing the generated virtual objects 31, and forms and stores a mapping table between the virtual objects 31 and the real sensors and actuators.

The controller 33 interacts with a client terminal 40 to manipulate connectivity between client-desired virtual objects 31. That is, the controller 33 functions to establish a dynamic connection between the virtual objects 31. Accordingly, in the virtualized IoT network according to the present invention, the controller 33 may forward data according to a rule defined in the routing mapping table. The controller 33 may be hosted in the virtualization server 30 or deployed on a separate server, when needed.

Further, the controller 33 has a mapping table including full route information such as a network identifier (ID), virtual object IDs, source IDs, and destination IDs. Each virtual object 31 has a flow table including information about a preconfigured delivery condition, a source ID, a destination ID, and a next receiving virtual object. The controller 33 delivers data to the next transmitting virtual object according to these conditions.

Communication may be conducted with multiple virtual objects 31 of multiple client terminals 40 through the controller 33 formed in the cloud environment.

The controller 33 processes a request from a client application and searches for a virtual object profile of a matching IoT device according to a user-designated criterion. A virtual network among virtual objects is established by virtual switches and virtual routers.

Further, multiple client applications 41 may set a connection relationship among multiple virtual objects 31 according to a desired network configuration. The client applications configure mapping tables that connect IoT devices to virtual objects and a virtual object path mapping table of the controller according to a user request, establish a network by establishing connections among the multiple virtual objects based on the tables, and display an interface screen to enable the user to set an operation criterion and a data forwarding condition for each virtual object.

FIGS. 5A and 5B are conceptual diagrams illustrating a virtualized IoT layered architecture according to the present invention. In FIGS. 5A and 5B, a physical layer (c) includes real IoT devices equipped with a function of sensing and actuating a device connected to the system.

A virtualization layer (b) serves as middleware between client applications and physical IoT devices. A virtual object 31 is generated for each connected IoT device in the virtualization layer (b) and used and shared among different client applications.

A virtualized IoT network is established among related IoT devices according to client application demands and desired settings. The virtual objects 31 provide an interface to the real IoT devices to use the service across different applications.

Various applications are hosted in the application layer (a) to use the services of the underlying virtualization layer (b).

As illustrated in FIG. 5A, a plurality of sensors S11, S12, and S14 and a plurality of actuators A13 to A15 in the physical layer are connected to virtual objects VS11, VS12, and VS14 of the sensors and virtual objects VA13 to VA15 of the actuators in the virtualization layer. The virtual objects in the virtualization layer are connected to the virtual objects 31 in the application layer, implemented on a client interface.

For example, the sensing virtual object VS14 of domain 1 D1 may be connected to the actuating virtual object VA22 of domain 2 D2, so that a sensing signal of the virtual object VS14 is transmitted to the virtual object VA22 of domain 2 D2 and thus activates the virtual object VA22.

The controller 33 has a master mapping table including all information about virtual IoT networks established on the cloud by various applications. In the IoT network virtualization scenario illustrated in FIG. 5A, there are two applications using virtual objects in the virtualization layer, and a communication flow for each virtual IoT network is shown. As illustrated in FIG. 5A, several virtual objects are shared between two virtual objects, for example, virtual objects VS21 and VA22 used by the two applications (application 1 and application 2). To handle and generate packets for the two applications, two entries (with entry IDs (e.g., 1010 and 1011)) are entered for the virtual object VS21, as illustrated in the master mapping table, Table 1.

Table 1 below is an exemplary master mapping table generated and referred to by the controller 33 of the present invention.

TABLE 1

<Controller master mapping table with sample entries>

| Entry ID | Network ID | VO ID | Source ID | Target ID | Received From | Set Source ID | Set Target ID | Send To | Entry Type | Expiry Time |
|---|---|---|---|---|---|---|---|---|---|---|
| 1001 | vIoTNet-1 | VS11 | — | — | S11 | S11 | A22 | VS14 | Event | Nov. 10, 2018 14:00 |
| 1002 | vIoTNet-1 | VS14 | S12 | A15 | VS12 | — | — | VA15 | Event | Nov. 10, 2018 14:00 |
| ... | ... | ... | ... | ... | ... | ... | ... | ... | ... | ... |
| 1010 | vIoTNet-1 | VS21 | — | — | S21 | S21 | A22 | VA22 | Event | Nov. 10, 2018 14:00 |
| 1011 | vIoTNet-2 | VS21 | — | — | S21 | S21 | A24 | VS23 | Event | Nov. 10, 2018 14:00 |
| 1020 | vIoTNet-2 | VS23 | S21 | A24 | VS21 | — | — | VA24 | Event | Nov. 10, 2018 14:00 |
| 1021 | vIoTNet-2 | VA24 | S21 | A24 | VS23 | — | — | A24 | Event | Nov. 10, 2018 14:00 |
| ... | ... | ... | ... | ... | ... | ... | ... | ... | ... | ... |

Each entry is uniquely identified by an entry ID. Every entry in the master mapping table represents the linkage between two real and virtual objects and belongs to a particular virtual IoT network indicated by a network ID.

This master mapping table contains master information about connectivity among the virtual objects, and connectivity information about an individual virtual object is identified by the virtual object field "VO ID". Every packet generated in this virtual IoT network is destined for a single/multiple target nodes. Source ID and Target ID in Table 1 indicate the origin and destination of a particular communication flow. When a virtual object receives a packet from a real device, then it sets the source and target ID according to a rule specified by the master mapping table.

The field "Received From" is used to identify the previous hop of a packet so that it may forward the packet to the next node as identified by the field "Send To".

The field "Entry Type" indicates the type of a data flow, such as event-based, periodic, and so on.

The field "Expiry Time" indicates the validity time of a virtual IoT network and all the entries will be purged when its validity time expires.

Table 2 below lists sample entries in a flow table for the virtual object VS21.

TABLE 2

<Virtual object VS21 flow table with sample entries>

| Entry ID | Network ID | Source ID | Target ID | Received From | Entry Type | Condition | Action | Interval | Set Source ID | Set Target ID | Send To | Expiry Time |
|---|---|---|---|---|---|---|---|---|---|---|---|---|
| 101 | vIoTNet-1 | — | — | S21 | Event | If data > threshold1 | Send message (command = Action1) | — | S21 | A22 | VA22 | Nov. 10, 2018 14:00 |
| 102 | vIoT-Net-2 | — | — | S21 | Periodic | — | Send message (command = Action2) | 0.1 | S21 | A24 | VS23 | Nov. 10, 2018 14:00 |

This virtual object is shared between the two applications. An entry is made to specify flow rules for data forwarding in the virtual object level. It is assumed that application 1 builds an event-based system, and its rule is triggered if a sensor data value is greater than a specific threshold. For application 2, a periodic control system that transmits a command to an actuator after a regular interval of 0.1 seconds is assumed in this example.

When the virtual object receives a data packet from the real sensor, its source and target ID fields are empty and set to virtual objects specified by a source and target ID setting. A single packet received at the virtual object may be forwarded to multiple target nodes by having multiple entries in the flow table.

Furthermore, if the flow entry is an event type, then the condition field is checked to determine if true (whether the received data is greater than the threshold) and then a corresponding action is taken as specified by an Action field. If the flow entry type is periodic, then the Interval field is used to set a timer for the next packet transmission.

Table 3 illustrates and describes mapping and the structure and operation of a flow table for a specific fire alarm and control scenario. Referring to the scenario of FIG. 7 to be described later, there are three rooms, each room having one smoke sensor and one sprinkler actuator. In addition, there is an alarm actuator in a hallway, which operates when a fire is sensed in any room.

TABLE 3

<Controller master mapping table for fire alarm and control>

| Entry ID | Network ID | VO ID | Source ID | Target ID | Received From | Set Source ID | Set Target ID | Send To | Entry Type | Expiry Time |
|---|---|---|---|---|---|---|---|---|---|---|
| 1001 | vIoTNet-1 | VS11 | — | — | S11 | S11 | A11 | VA11 | Event | Nov. 10, 2018·14:00 |
| 1002 | vIoTNet-1 | VS11 | — | — | S11 | S11 | A14 | VA14 | Event | Nov. 10, 2018·14:00 |
| ... | ... | ... | ... | ... | ... | ... | ... | ... | ... | ... |
| 1020 | vIoTNet-1 | VA14 | S11 | A14 | VS11 | — | — | A14 | Event | Nov. 10, 2018·14:00 |
| 1021 | vIoTNet-1 | VA14 | S12 | A14 | VS11 | — | — | A14 | Event | Nov. 10, 2018·14:00 |

Table 3 lists sample entries for the master mapping table in the controller 33. When there is a single virtual IoT network, all entries are 'vIoTNet-1' in the network ID fields. In addition, since fire detection and control is an event based on an application scenario, all entries are "events" in the Entry Type fields.

All packets generated in this virtual IoT network structure need to be transmitted to two target nodes.

Figure 7:
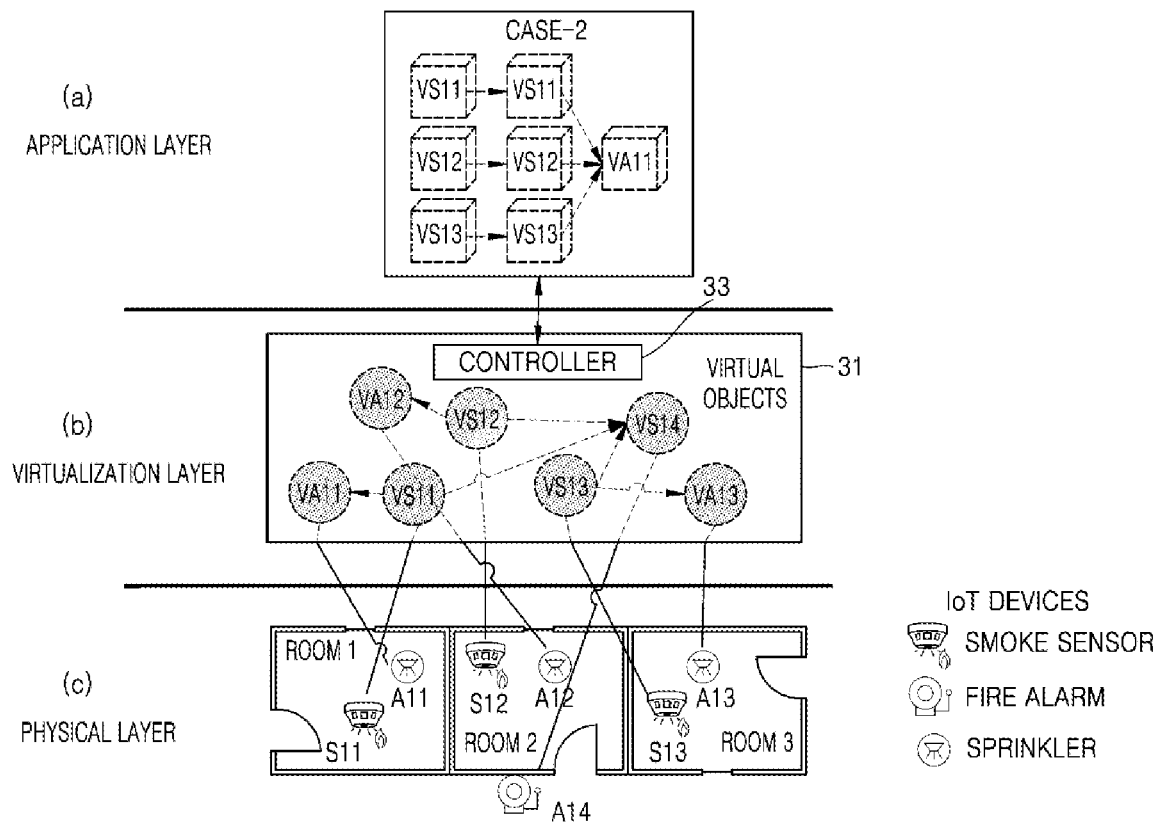
FIG. 7 is a diagram of exemplary many-to-one device communication in the virtualized IoT network according to another embodiment of the present invention.

For example, when the virtual object VS11 receives a data packet from a sensor V11 in FIG. 7, it is necessary to check a given condition field in Table 4, a virtual sensor VS11 flow table for fire alarm and control. If the condition in Table 4 is true, that is, if a value measured by the smoke sensor is greater than a threshold, the packet will be transmitted to the two nodes (e.g., A11 and A14). The source and target IDs are set accordingly, and a command message (a command to turn on a sprinkler (command=Turn On sprinkler) or a command to turn on an alarm (command=Turn On Alarm)) is transmitted to each actuator node through virtual objects (e.g., VA11 and VA14).

TABLE 4

<Virtual sensor VS11 flow table for fire alarm and control>

| Entry ID | Source ID | Target ID | Received From | Entry Type | Condition | Action | Interval | Set Source ID | Set Target ID | Send To | Expiry Time |
|---|---|---|---|---|---|---|---|---|---|---|---|
| 101 | — | — | S11 | Event | If smoke > threshold | Send message (command = Turn ON sprinkler) | — | S11 | A11 | VA13 | Nov. 10, 2018· 14:00 |
| 102 | — | — | S11 | Event | If smoke > threshold | Send message (command = Turn ON.Alarm) | — | S11 | A14 | VA14 | Nov. 10, 2018· 14:00 |

Similarly, flow tables for VA11 and VA14 are shown as Tables 5 and 6 below.

TABLE 5

<Virtual actuator VA11 flow table>

| Entry ID | Source ID | Target ID | Received From | Entry Type | Condition | Action | Interval | Set Source ID | Set Target ID | Send To | Expiry Time |
|---|---|---|---|---|---|---|---|---|---|---|---|
| 111 | S11 | A11 | VS11 | Event | If command = Turn·ON· sprinkler | Activate sprinkler | — | — | — | A11 | Nov. 10, 2018· 14:00 |

TABLE 6

<Virtual actuator VA14 flow table>

| Entry ID | Source ID | Target ID | Received From | Entry Type | Condition | Action | Interval | Set Source ID | Set Target ID | Send To | Expiry Time |
|---|---|---|---|---|---|---|---|---|---|---|---|
| 141 | S11 | A14 | VS11 | Event | If command = Turn ON Alarm | Activate Alarm | — | — | — | A14 | Nov. 10, 2018 14:00 |

According to another embodiment, as illustrated in FIG. 5B, the plurality of sensors S11 to S13 and the plurality of actuators A11 to A13 in the physical layer are connected to the virtual objects VS1 to VS3 of the sensors and the virtual objects VA1 to VA3 of the actuators in the virtualization layer. The virtual objects of the virtualization layer are connected to the virtual objects 31 of the application layer, implemented on a client interface.

For example, the sensing virtual object VS12 in domain 1 D1 may be connected to the actuating virtual object VA24 in domain 2 D2 to transmit a sensing signal of the virtual object VS12 to the virtual object VA24 in domain 2 D2 and thus to activate the virtual object VA24.

The virtualization server 30 is operated by server virtualization software. The server virtualization software is software that virtualizes a processor, a memory, a network, and a storage of the virtualization server 30. The use of the server virtualization software enables virtualization physical resources of server hardware such as the processor and the memory into logical resources.

In the virtual IoT network system, all IoT devices S1 to Sn and A1 to An transmit registration requests including their profile information to the preconfigured virtualization server 30. Virtual objects VS1 to VSn and VA1 to VAn are generated for the IoT devices. The virtualization server 30 transmits an acknowledgment (Ack) signal to each IoT device.

That is, each IoT device transmits a registration request to the preconfigured virtualization server 30 and waits for a response for a predetermined response time. If the IoT device fails in receiving the response for the response time, the IoT device transmits another request because there is a possibility that the registration request packet has been lost in the network.

A sensing IoT device transmits sensing data to the virtualization server 30 at a designated interval. The sensing IoT device may transmit data to a plurality of target devices at various time intervals for a designated time. Information about each target device may be stored in a database of the virtualization server 30 in the form of a flow. Each flow includes information about its own target node, data transmission interval, and transmission end time.

The virtualization server 30 performs necessary configuration settings, receives three types of messages from IoT devices or client applications:

Registration request message requesting generation of virtual objects;

Request message from a client application for establishment of a virtualized IoT network through user selection of desired virtual objects through the client application. The virtualization server 30 transmits an activation command to a selected IoT device to initiate data transmission; and Sensing message from a sensing IoT device, which is to be forwarded to a corresponding target IoT device.

The user requests IoT device initialization by the client application. The controller 33 processes the initialization request, searches for virtual object profiles of IoT devices 20 that match according to a user-specified criterion, and transmits a virtual object list to the client application.

Upon receipt of the virtual object list, the client application 40 establishes a desired network by establishing connections among the virtual objects. Then, the terminal on which the client application 40 is installed transmits user-desired connection settings for the virtual objects to the controller 33 on the cloud.

The controller 33 serves to establish desired network settings by manipulating the virtual objects in the virtualization server 30. The controller 33 establishes dynamic connections among related virtual objects according to a desired setting from each user, and updates the mapping list.

Then, an activation command is transmitted to a corresponding IoT sensor to start data transmission. After sensing data is received at the corresponding virtual object, the controller 33 selects a mapped device from the mapping list and transmits an activation command to the next connected virtual object.

The device corresponding to the virtual object performs a desired operation and transmits an Ack signal to the client application. The process continues until a device activation time is over. When the activation time is over, connectivity information for a particular virtualized IoT network is deleted from the mapping list.

Three different use case scenarios are presented below to illustrate the working and utility of the IoT network virtualization concept according to the present invention. In each scenario, a particular application scenario that requires some specific type of connectivity among related IoT devices is described. Through these examples, how a virtualized IoT network is established among corresponding virtual objects is described to achieve a desired application objective.

Scenario 1

Figure 6:
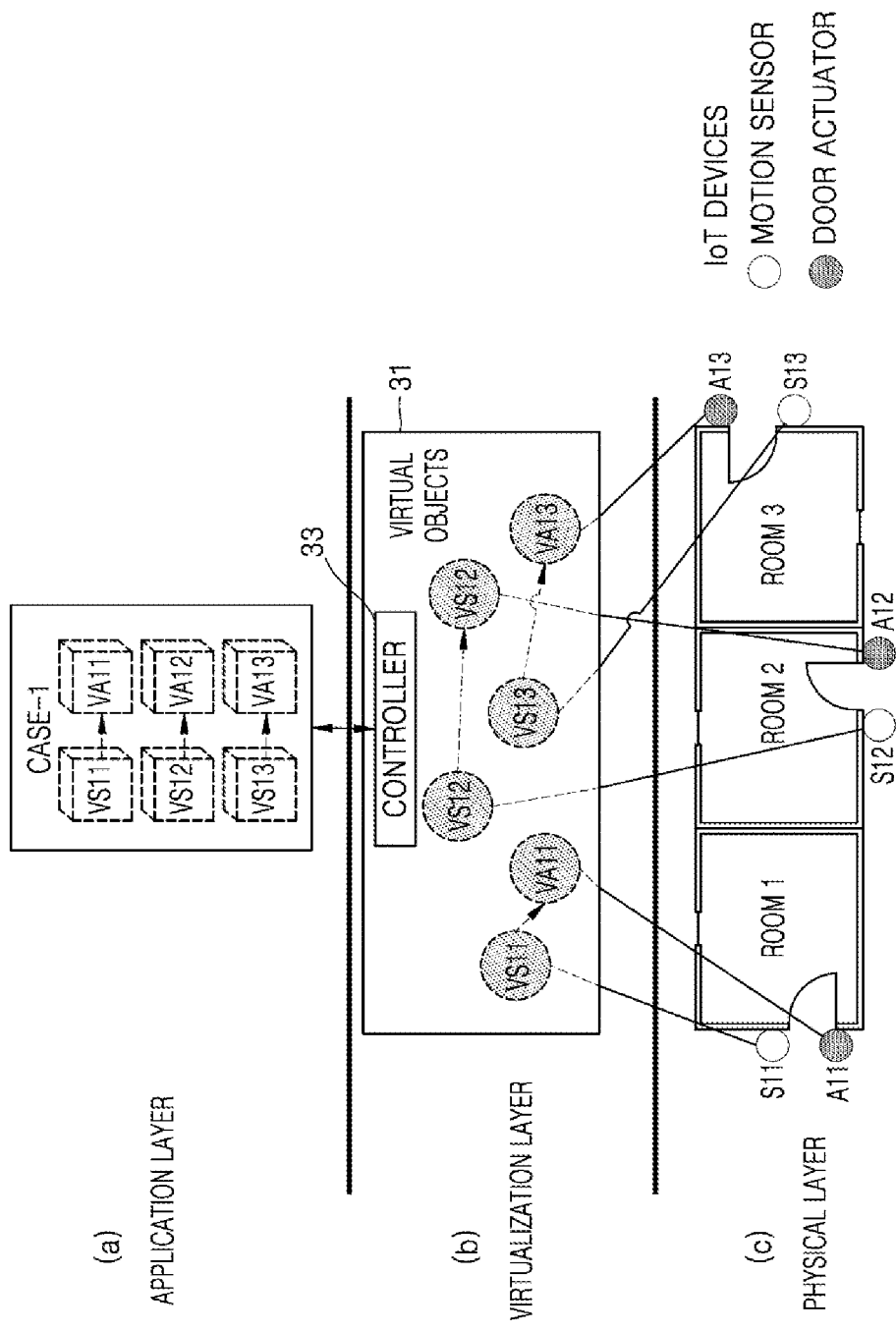
FIG. 6 is a diagram illustrating exemplary one-to-one device communication in the virtualized IoT network according to an embodiment of the present invention.

This scenario requires a direct one-to-one connection between IoT devices through virtual objects based on a simple rule using condition/action. Reference is made to FIG. 6 to describe an application scenario example.

As illustrated in FIG. 6, an IoT-based automatic door opening application in a small living domain that includes three rooms may be developed. Two types of IoT devices (i.e., a motion sensor S11, S12 or S13 and a door actuator A11, A12, or A13) installed in each of the three rooms are considered. A motion sensor is deployed at the door of every room, and door opening and closing is controlled by a corresponding door actuator.

A total of six virtual objects corresponding to the motion sensors S11, S12 and S13 and the three door actuators A11, A12 and A13 are generated in the virtualization layer by the virtualization server 30. A client application interface with a virtual object list may be displayed on a user terminal, and a user may specify desired connectivity between the motion sensors S11, S12 and S13 and the corresponding door actuators A11, A12 and A13 through this interface.

The user may also specify a simple rule indicating a sensitivity level of motion sensing to activation of a door opening actuator through the client application interface.

As illustrated in FIG. 6, the controller 33 updates settings of each virtual object to establish desired connectivity settings among related virtual objects. Accordingly, the virtualization server 30 transmits an activation command to the motion sensor S11. Then, the motion sensor S11 starts to transmit motion sensing data at a designated interval to a corresponding virtual object. A simple rule may be applied to determine whether to transmit an activation command to the door opening actuator.

Scenario 2

This scenario requires complex interconnection between IoT devices through virtual objects by establishing one-to-one and many-to-one interconnections. Reference is made to FIG. 7 to better describe this exemplary application scenario. As illustrated in FIG. 7, an IoT-based fire safety application in a small living domain that includes three rooms may be developed.

Three types of IoT devices, that is, smoke sensors S11, S12 and S13 for fire detection and two kinds of actuators (an alarm A14 and sprinklers A11, A12 and A13) are considered in this network. The smoke sensors S11, S12 and S13 and the sprinklers A11, A12 and A13 are deployed inside the respective rooms and the alarm A14 is installed in a hallway.

A total of seven virtual objects corresponding to the three smoke sensors, the three sprinklers, and the one alarm are generated in the virtualization layer by the virtualization server 30.

The user may get a virtual object list through the client application interface and specify desired connectivity between the smoke sensors S11, S12 and S13 and the actuators. The user may also specify a simple rule indicating the sensitivity level of smoke sensing for activation of the corresponding sprinklers A11, A12 and A13 and alarm A14.

In this scenario, one-to-one connectivity is established between the smoke sensors S11, S12 and S13 and the corresponding sprinklers A11, A12 and A13, whereas all of the smoke sensors S11, S12 and S13 are also connected to the single alarm actuator A14 which requires a many-to-one type of connectivity.

The controller 22 updates settings of each virtual object to establish desired connectivity settings among related virtual objects as illustrated in FIG. 7. Accordingly, the virtualization server 30 transmits an activation command to the smoke sensors S11, S12 and S13. The smoke sensors S11 to S13 start to transmit smoke sensing data at a designated interval to the corresponding smoke sensing virtual objects.

A simple rule is applied to determine whether to transmit activation commands to a sprinkler and an alarm actuator.

An application logic for this scenario is represented in the application layer, and its implementation is realized in the virtualization layer through establishment of a virtualized IoT network among related virtual objects.

Scenario 3

Figure 8:
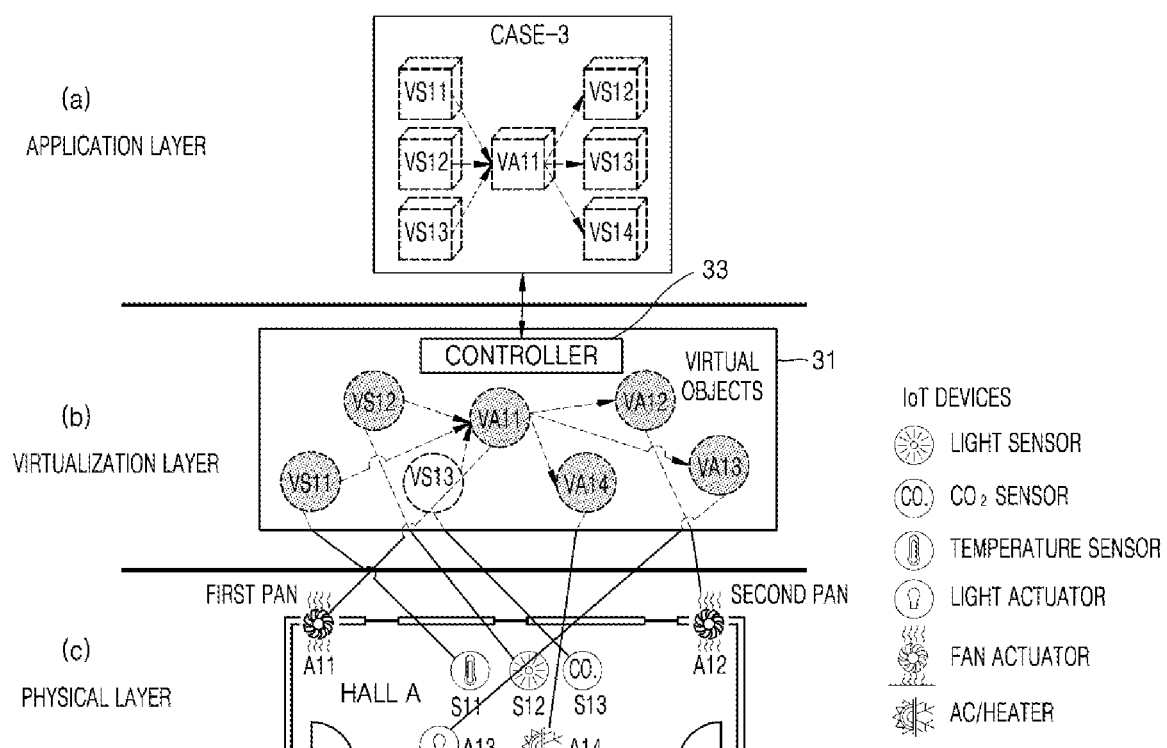
FIG. 8 is a diagram of exemplary many-to-one device communication in the virtualized IoT network according to another embodiment of the present invention.

This scenario requires complex interconnection between IoT devices through virtual objects. This scenario is different from the other two cases in that a specific virtual object has the capacity of transmitting and receiving data. An exemplary application scenario is illustrated in FIG. 8 to better explain this scenario. In this case, a client may develop an IoT-based indoor environment application in a small living domain that includes a big hall. The user may control indoor temperature, lighting, and air quality using this indoor application.

In this network, six different types of IoT devices, that is, three sensors (i.e., a temperature sensor S11, an light sensor S12, and a $CO_2$ sensor S13) and three actuators (i.e., an air conditioner (AC)/heater A14, an illumination actuator A13 such as a light, and two fans A11 and A12) are considered.

The user may specify a desired range for indoor temperature, lighting, and air quality. If the indoor temperature is above the desired range, the AC will be operated to cool down the indoor environment. If the indoor temperature is below the desired range, the heater A14 will be operated to heat the indoor environment.

Similarly, if the indoor illumination level is below the user desired range, then the illumination actuator A13 will be turned on. Likewise, if the indoor air quality is getting worse (a higher $CO_2$ concentration than a specified level), then the fans A11 and A12 are operated to maintain air quality.

For this scenario, a total of seven virtual objects corresponding to the three sensors and the four actuators are generated in the virtualization layer by the virtualization server 30 as illustrated in FIG. 8.

The user may get a virtual object list through the client application interface and specify connectivity among corresponding sensors and actuators.

The user may also specify a simple rule per a desired range for each indoor parameter for activation of corresponding actuators.

As illustrated in FIG. 8, the controller 33 updates settings of each virtual object to establish desired connectivity settings among related virtual objects. Accordingly, the virtualization server 30 transmits an activation command to each sensor.

The sensors S11, S12 and S13 transmit sensing data about the indoor environment at a designated interval to the corresponding sensing virtual objects.

According to a virtual IoT configuration set by the user, sensing virtual objects VS11 to VS13 forward data to a designated fan virtual object VA11, and whether to transmit an activation command to each actuator is determined.

The preset fan virtual object VA11 serves as a gateway in this embodiment. The fan virtual object VA11 may calculate comfort information based on sensing values of temperature, lighting, and air quality, and thus determine whether to activate each of the AC/heater A14, the light A13, and the fan A12.

This scenario requires establishment of many-to-one and one-to-many connectivity between sensing virtual objects and actuating virtual objects. Therefore, any one of the sensing virtual objects or the actuating virtual objects may be set and operate as a router.

To analyze IoT network virtualization, a virtual object network may be designed and simulated by objective modular network testbed in C++ (OMNET++) in the present invention.

To simulate a virtualized IoT network, an IoT device protocol, an application layer protocol, and a client device protocol should be determined.

The IoT device protocol for virtual network simulation is designed for requesting registration to a virtualization server by each IoT device to create a virtual object in the virtualization server.

The virtualization server protocol for virtual network simulation is designed for generating virtual objects according to registration requests from IoT devices, making a virtual object list, and forming a mapping table between the IoT devices and the virtual objects. The virtualization server protocol is a protocol in which upon receipt of a control message from the controller, the virtualization server analyzes the control message, selects an IoT device corresponding to an actuating virtual object from the mapping table, and activates a sensing IoT device or an actuating IoT device.

The IoT client device protocol for virtual network simulation is an application layer protocol designed for IoT client devices at the administrator side. This protocol allows a user to get a desired virtual object list from the virtualization server and specify required network topology settings by mapping corresponding virtual objects.

Figure 9:
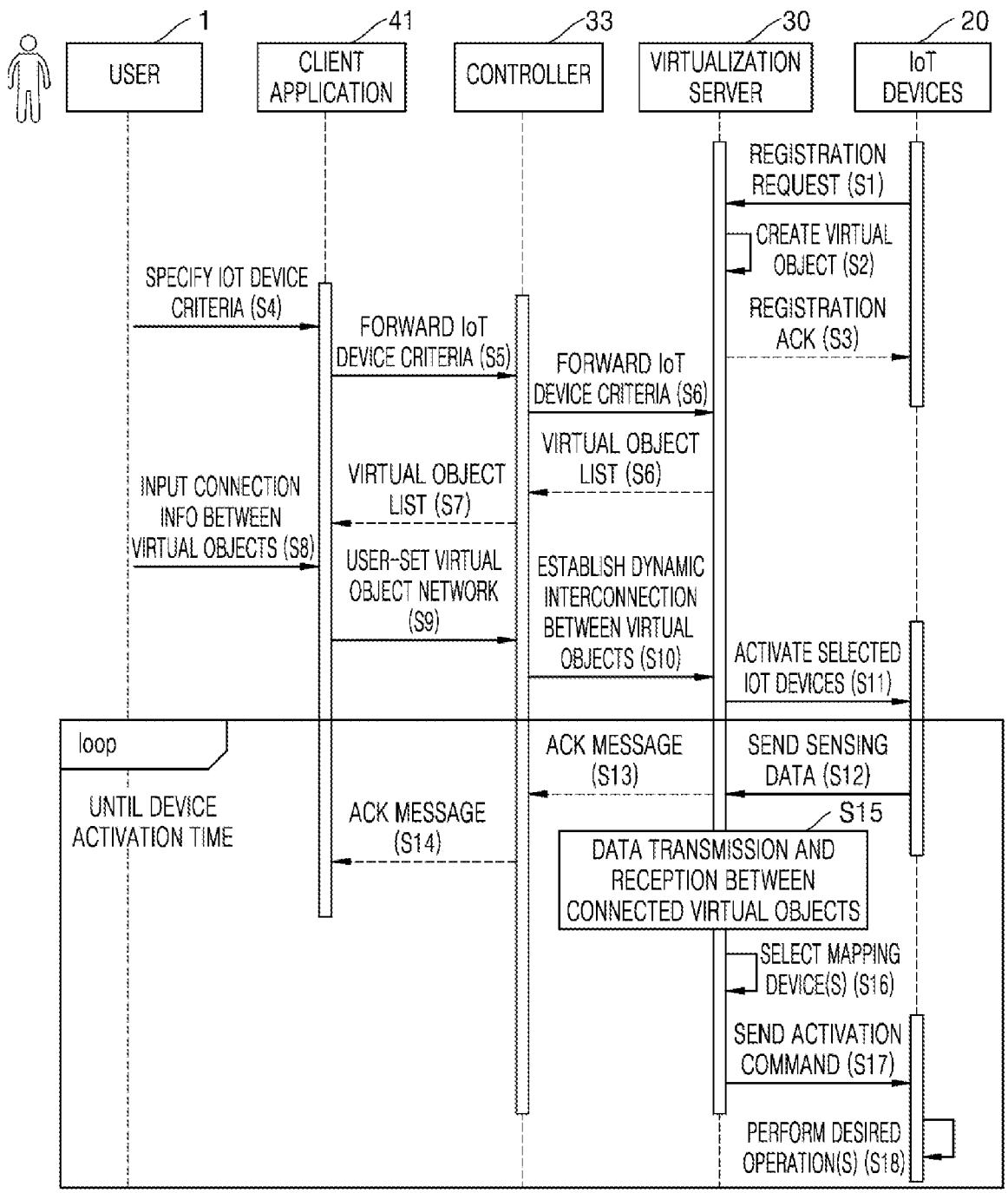
FIG. 9 is an operational sequence diagram of the virtualized IoT network according to the present invention.

FIG. 9 is an operational sequence diagram of the virtualized IoT network according to the present invention. As illustrated in FIG. 9, a user device specifies IoT device criteria and configures desired settings.

IoT devices 20 transmit registration request messages to the virtualization server 30 (S1). The virtualization server 30 generates virtual objects for the IoT devices 20 (S2). The virtualization server 30 lists and stores information about the virtual objects and transmits a registration Ack message to the IoT devices 20 (S3).

When the user specifies IoT device criteria through a client application interface (S4), the client application transmits the IoT device criteria to the controller 33 (S5). The controller 33 transmits the IoT device criteria to the virtualization server 30 (S6).

The virtualization server 30 makes a virtual object list and transmits the virtual object list to the controller 33 (S7). The controller 33 transmits the virtual object list to the client application 41 (S8). Then the user configures desired settings for each virtual object through the client application 41 (S8). When the user configures connection deployment settings between virtual objects, the client application 41 transmits the user settings to the controller 33 (S9).

The controller 33 requests establishment of dynamic interconnection to the virtualization server 30 according to the user settings (S10), and the virtualization server 30 transmits a selected IoT device activation signal to IoT devices and thus activates the IoT devices (S11).

Sensing IoT devices receiving the activation command transmit sensing data to the virtualization server 30. The virtualization server 30 transmits an Ack message indicating reception of the sensing data to the controller 33 (S13), and the controller 33 transmits an Ack message to the client application 41 (S14).

Subsequently, sensing data is transmitted and received between sensing virtual objects and actuating virtual objects for which connections are configured (S15).

Then, when an IoT device corresponding to the sensing data needs to be activated, the virtualization server 30 selects a mapped IoT device corresponding to the sensing data (S16) and transmits an activation command to the IoT device (S17).

As described above, the present invention facilitates sharing of resources and the rapid development of diverse applications on top of the virtualization layer by building a dynamic virtual network and thus establishing a dynamic end-to-end connection between IoT devices.

According to the above-described cloud-based IoT network virtualization system and networking method, a virtual network over which signals are transmitted and received between virtual objects is built by virtualizing all of sensors and actuators included in an IoT network into virtual objects.

Therefore, network deployment cost may be reduced, compared to a physical network. Further, a manager may dynamically configure and build a network, thereby facilitating modifications to the configuration of an IoT network.

INDUSTRIAL APPLICABILITY

As is apparent from the above description, the present invention may provide a technique of building a virtual network over which signals are transmitted and received between virtual objects by virtualizing sensors and actuators of an IoT network into virtual objects, with reduced network deployment cost compared to a physical network, and enabling a manager to dynamically configure and build a network, which facilitates modifications to the configuration of an IoT network.

The invention claimed is:

1. A cloud-based Internet of things (IoT) device virtualization network system comprising:
   a cloud-based virtualization server configured to create sensing virtual objects and actuating virtual objects for a plurality of IoT devices including sensors and actuators in response to registration requests from the plurality of IoT devices, generate a virtual object list and a mapping table including information about mapping between the IoT devices and the virtual objects, and store the virtual object list and the mapping table;
   a client terminal configured to store a client application for receiving the virtual object list from the virtualization server, configuring a connection setting between virtual objects based on the virtual object list, and transmitting information about the connection setting to the virtualization server; and
   a controller formed on a cloud and configured to manipulate connectivity between a sensing virtual object and an actuating virtual object according to the connection setting of the client application,
   wherein a sensing signal is transmitted and received between the sensing virtual object and the actuating virtual object for which the connection setting is configured, and the virtualization server receives sensing data from an IoT device and transmits, to the IoT device, an activation command to an IoT device to be activated as a result of the signal transmission and reception between the connected objects.

2. The cloud-based IoT device virtualization network system according to claim 1, wherein a sensing IoT device transmits sensing data in response to an activation command from the virtualization server, the sensing virtual object transmits a sensing signal to an already connected actuating virtual object, the actuating virtual object is activated by receiving the sensing signal, and the controller transmits an activation signal to an actuator corresponding to the activated activating virtual object.

3. The cloud-based IoT device virtualization network system according to claim 1, wherein the client application provides an interface function for connection settings among a plurality of virtual objects and a user setting about an operation criterion for each virtual object.

4. The cloud-based IoT device virtualization network system according to claim 1, wherein one of the sensing virtual object and the actuating virtual object is available for configuration and operation as a router.

5. The cloud-based IoT device virtualization network system according to claim 1, wherein the controller exists in the virtualization server or a separate server.

6. The cloud-based IoT device virtualization network system according to claim 1, wherein the controller receives the sensing data from the IoT device on the cloud, stores the sensing data in correspondence with the virtual object corresponding to the IoT device, and forwards the sensing data according to a preconfigured path and a preconfigured condition for each virtual object.

7. The cloud-based IoT device virtualization network system according to claim 1, wherein the controller configures any one of a plurality of sensing virtual objects and a plurality of actuating virtual objects as a path for network formation and has a mapping table including full path information with a network identifier (ID), a virtual object ID, a source ID, and a destination ID, each virtual object has a flow table including information about a delivery condition, a source ID, a destination ID, and a next receiving virtual object, and the controller transmits data to a next transmitting virtual object according to the condition.

8. A cloud-based virtualized Internet of things (IoT) device networking method comprising:
  connecting IoT devices of multiple things in a physical space to a cloud, and requesting registration to a virtualization server formed in a cloud-based manner by a plurality of sensing or actuating IoT devices;
  generating sensing virtual objects and actuating virtual objects for the requesting IoT devices by the virtualization server;
  forming and storing a virtual object list and a mapping table including information about mapping between the IoT devices and the virtual objects, and transmitting the virtual object list to a client terminal by the virtualization server;
  configuring a connection setting between the virtual objects based on the virtual object list and transmitting user connection setting information by the client terminal;
  dynamically connecting a sensing virtual object to an actuating virtual object according to the user connection setting information by a controller of the virtualization server;
  transmitting and receiving a signal between the sensing and actuating virtual objects for which the connection setting is configured; and
  transmitting, to an IoT device, a command requesting activation of an IoT device to be activated for signal transmission and reception between the sensing virtual object and the actuating virtual object by the virtualization server.

9. The cloud-based virtualized IoT device networking method according to claim 8, further comprising receiving sensing data from the IoT device on the cloud, storing the sensing data in correspondence with the virtual object corresponding to the IoT device, and forwarding the sensing data according to a preconfigured path and a preconfigured condition for each virtual object by the virtualization server.

10. The cloud-based virtualized IoT device networking method according to claim 8, further comprising:
  activating a sensing device to be activated according to the user setting by the virtualization server; and
  when the actuating virtual object is activated by receiving sensing data, transmitting an activation signal to an IoT device corresponding to the actuating virtual object by the virtualization server.

11. The cloud-based virtualized IoT device networking method according to claim 8, wherein the controller has a mapping table including full path information with a network identifier (ID), and a virtual object ID, a source ID, and a destination ID, each virtual object has a flow table including information about a delivery condition, a source ID, a destination ID, and a next receiving virtual object,
  further comprising transmitting data to a next transmitting virtual object according to a preconfigured path condition by the controller.

12. The cloud-based virtualized IoT device networking method according to claim 8, wherein the client terminal displays an interface screen for a connection setting among a plurality of virtual objects and a user setting about an operation criterion of each virtual object.

13. The cloud-based virtualized IoT device networking method according to claim 8, further comprising configuring any one of sensing or actuating virtual objects as a router for network formation.

* * * * *